United States Patent [19]

Leary

[11] Patent Number: 5,194,124

[45] Date of Patent: Mar. 16, 1993

[54] MOLTEN SALT ELECTROLYTIC BENEFICIATION OF IRON OXIDE-CONTAINING TITANIFEROUS ORES TO PRODUCE IRON AND HIGH-GRADE TiO$_2$

[75] Inventor: Kevin J. Leary, Waverly, Tenn.

[73] Assignee: E. I. du Pont de Nemours and Company, Wilmington, Del.

[21] Appl. No.: 798,608

[22] Filed: Nov. 26, 1991

[51] Int. Cl.$^5$ .............................................. C25C 3/34
[52] U.S. Cl. ................................................. 204/64 R
[58] Field of Search ............................ 204/64 R, 64 T

[56] References Cited

U.S. PATENT DOCUMENTS

| | | |
|---|---|---|
| 4,047,934 | 9/1977 | Pollard et al. . |
| 4,165,262 | 8/1979 | Juckniess et al. . |
| 4,272,343 | 6/1981 | Brunsell et al. . |
| 4,460,550 | 7/1984 | Rado et al. . |
| 4,563,338 | 1/1986 | Seon et al. . |
| 4,637,865 | 1/1987 | Sergent et al. . |

FOREIGN PATENT DOCUMENTS 1530806 11/1978 United Kingdom .

Primary Examiner—T. M. Tufariello
Attorney, Agent, or Firm—David J. Gould

[57] ABSTRACT

Disclosed is a process for beneficiating titaniferous material which contains iron oxide. The titaniferous material is mixed with a molten salt or mixture or molten salts in which iron oxide dissolves to produce iron ions and oxyanions. The iron ions are electrolytically reduced to iron at the cathode and deposited as high purity iron on the cathode. The oxyanions react with a carbonaceous anode to generate CO and/or $CO_2$. A beneficiated $TiO_2$ product is recovered from the molten salt or mixture of molten salts.

19 Claims, No Drawings

MOLTEN SALT ELECTROLYTIC BENEFICIATION OF IRON OXIDE-CONTAINING TITANIFEROUS ORES TO PRODUCE IRON AND HIGH-GRADE TIO₂

BACKGROUND OF THE INVENTION

1. Field of the Invention

The present invention provides a process for beneficiation of iron oxide-containing titaniferous materials by electrolysis in molten salt to produce iron and high-grade $TiO_2$.

2. Description of the Prior Art

Titaniferous materials, such as ilmenite, which contain iron oxide are used as feed in the chloride process for making $TiO_2$ pigment and Ti metal. In the chloride process iron and other impurities are chlorinated with the titanium, causing excessive chlorine consumption as well as a problem of iron chloride waste disposal. It is desirable to have an economic process to remove iron from titaniferous materials before their use as feed in the chlorinator.

British Patent 1,530,806 discloses a process for beneficiating ores containing metallic values in the form of refractory oxides and pyrometallurgically reducible metallic compounds. The ore is subjected to pyrometallurgical reduction to produce a metal-refractory oxide composition, the metallic portion of the composition being the reduced product of the pyrometallurgically reducible metallic compounds. The metal-refractory oxide composition is then subjected to electrolysis in an aqueous medium to solubilize at least a major part of the metallic portion of the composition, and recovering a refractory oxide product from the electrolytic cell. This process is applicable to titaniferous ores, and in another embodiment, the reduced ore may be used as a soluble anode where $TiO_2$ is recovered at the anode, and Fe at the cathode. Similar processes in which reduced iron-containing titaniferous ores are electrolyzed in aqueous mediums to yield Fe as pure as 99.9%, and a beneficiated $TiO_2$ product containing greater than 90% $TiO_2$ have also been disclosed by: Cunningham, G. L. and Pretka, F., U.S. Pat. No. 2,852,452 (1958); Allan, B. W. U.S. Pat. No. 3,941,668 (1976); Jain, S. K. and Jena, P. K., Trans. Soc. Adv. Electrochem. Sci. Technol. 11(4), 481-5 (1976); Allan, B. W., Ger. Pat. DE 2,557,411 (1977); Mori, et al., Japan Patent JP 52,128,817 (1977); Pandey, et al., Res. Ind. 22(2), 77-9 (1977); Allan, B. W., Japan Patent JP 60,033,769 (1985);

U.S. Pat. No. 4,637,865 discloses a process for extracting a metal from a source material containing the metal. The source material is leached with an aqueous solution containing an N-halohydantoin compound to produce an aqueous leachate containing the metal which is then recovered by electrodeposition.

U.S. Pat. No. 4,272,343 discloses a process for beneficiating ilmenite ore using electrolytic reduction. The ilmenite ore is mixed with an acidic solution and the mixture is electrolysed to reduce at least some of the ferric iron to ferrous which dissolves in the acidic solution. It is mentioned in column 2, lines 7-11, that potentiostatic control in the electrolysis is preferred over constant current or constant voltage conditions, since the working electrode can be maintained at the optimum potential versus a reference electrode for the reduction of the iron in the ore. In the electrolytic cell the acidic leaching solution comprises the catholyte which is separated from the anode and anolyte solution by a diaphragm. The leach liquor is separated from the beneficiated ore by filtration, centrifugation or the like.

U.S. Pat. No. 4,047,934 discloses a process for removing iron from an oxide-containing material comprising iron oxide in the presence of a non-ferrous metal oxide. The oxide-containing material is heated with a solid carbonaceous material in a molten salt bath at a temperature or 750-1300 degrees Celsius; the salt bath comprising at least one chloride selected from the group consisting of alkali metal chlorides and alkaline earth metal chlorides, and optionally contains a hydrogen chloride generator. The iron oxide in the oxide-containing material is selectively reduced to iron while leaving non-ferrous metal oxide substantially unreduced. The salt enhances segregation of the iron from the oxide.

Madkour, et al., J. Electroanal. Chem. Interfacial Electrochem., 199(1), 207-210 (1986) disclose a method for the electrowinning of Ti and $TiO_2$ from ilmenite ore. The mother liquor used for electrolysis was produced by direct leaching with $H_2SO_4$ or by the fusion method using NaOH or $Na_2S_2O_7$ as fluxes at 700 degrees Celsius. The Ti and $TiO_2$ were deposited on platinum sheet cathodes. Several baths suitable for the electrochemical extraction of Ti and $TiO_2$ from ilmenite are given. Only the oxalate bath is suitable for recovery of $TiO_2$.

U.S. Pat. No. 4,165,262 discloses a method of electrolytically producing Ti metal by introducing an ionisable Ti compound into a molten salt bath in the cathode compartment and impressing an emf to form gas at the anode and deposit Ti at the cathode. The preferred titanium source is titanium tetrachloride, and the preferred salt is a eutectic mixture of LiCl and KCl. Other disclosures related to the electrolytic production of Ti metal from a titanium halide melt or a molten salt containing titanium ore are given in: U.S. Pat. Nos. 4,118,291; 4,082,628; 3,777,012; 3,711,386; 2,921,890; 2,757,135; and French Patent FR2,359,221 A.

U.S. Pat. No. 4,563,338 discloses a process for selective chlorination of a simple or complex mixture of metallic oxides containing at least one element to be recovered chosen from Fe, Ti, Al, and Si together with accompanying impurities. The process comprises milling and calcining the starting material, suspending the material in a molten salt bath, and introducing chlorinating agents into the bath. The bath should be maintained at a temperature sufficient to ensure that at least one of the metallic chlorides formed volatilises. Selective extraction of the chlorides formed is achieved by successive introduction of specific chlorinating agents of increasing chlorinating power, in a number at least equal to the number of vaporisable elements to be recovered. The process is useful for among other things, ilmenite ores. A related report is given by Tremillon, et al., NATO ASI Ser., Ser. C, 202 (Molten Salt Chem.), 305-27 (1987).

U.S. Pat. No. 4,460,550 discloses a process for producing titanium tetrachloride from titanium ore and reductant suspended in molten salt, at a temperature between about 800 degrees and 1000 degrees Celsius, by passing chlorine through the melt. The salt may be NaCl, KCl, $CaCl_2$ or their mixtures. The reductant is preferably coke. A similar disclosure is given in U.S. Pat. No. 4,442,075. Other disclosures related to molten salt chlorination of titaniferous ores are given in: Murphy, A. H. U.S. Pat. Nos. 4,518,426 and 4,487,677; Mukliev, et al., Soviet Patent SU-956,588; Ferry, et al. Trans. Instn. Min. Metall. (Sect. C: Mineral Process.

Extr. Metall.) 97, p. C21 (1988); Akashi, et al., Nippon Kogyo Kaishi 86(989) 553-8 (1970); Egami, et al., Nippon Kogyo Kaishi 86(992), 871-6 (1970).

SUMMARY OF THE INVENTION

This invention relates to a process for beneficiating iron oxide-containing titaniferous ores by electrolysis in molten salt. The iron oxide-containing titaniferous ore is mixed with a molten salt or mixture of molten salts in which iron oxide is soluble thereby producing iron ions and oxyanions. The dissolved iron ions are electrolytically reduced at a cathode to produce a high purity elemental iron deposited on the cathode. The oxyanions react with a carbonaceeous anode to generate CO and/or $CO_2$. Beneficiated $TiO_2$ is recovered from the molten salt or mixture of molten salts.

DETAILED DESCRIPTION OF THE PREFERRED EMBODIMENTS

In the process of this invention the main product is beneficiated $TiO_2$, but high purity iron is a valuable by-product. The particle size and morphology of the iron powder deposited at the cathode varies from needle like particles to more slab-like particles depending on the molten salt system and electrolysis conditions employed.

A distinct advantage of molten salt systems over aqueous systems is that the potential difference at which molten salts decompose is generally much larger than the potential difference at which water decomposes. As a result the cathode can be maintained at a sufficiently negative potential to obtain high iron deposition rates without reducing the molten salts.

While the proportion of iron oxide-containing titaniferous ores mixed with the molten salt system is dependent on the molten salt system used usually it is 1-50, preferably 1 to 20 weight percent, based on the total weight.

Various molten salts may be used to dissolve iron oxidecontaining titaniferous materials, for example, alkali and alkaline earth halides (especially chlorides), hydroxides, carbonates, borates and sulfates. Preferred are mixtures thereof to produce an optimum system.

An optimum molten salt system will have many of the following characterics:

1—high solubility for iron oxide at temperatures below 1300 degrees Celius, preferably between 100-1000 degrees Celius,
2—relatively lower solubility for $TiO_2$, preferably minimal solubility for $TiO_2$,
3—high decomposition voltage to permit sufficiently negative potentials to be reached at the cathode and sufficiently positive potentials to be reached at the anode to allow high deposition rates without decomposing the salt,
4—non-viscous, thereby providing high transport rates to iron ions and oxyanions to the electrodes and permitting rapid evolution of CO and/or $CO_2$ from the anode,
5—easily removed, preferably by washing, from the particulate and iron, and
6—minimally consumed during the process.

An example of molten salts that satisfy many of the above characteristics are mixtures of alkali and alkaline earth chlorides, for example, NaCl, LiCl-KCl, LiCl-KCl-NaCl, and LiCl-KCl-CaCl$_2$.

An eutectic mixture of the salts is advantageous because of the low melting temperature of such a mixture. Such a molten salt system is an eutectic mixture of LiCl-KCl, preferably 35-55 percent LiCl, more preferably about 45% LiCl and about 55% KCl. Many of the examples use a molten salt system of 55.6 percent (41 mol %) KCl and 44.4 percent (59 mol %) LiCl. However, a drawback of this molten salt system is that while it selectively dissolves the iron oxide fraction of ilmenite, the solubility of the iron oxide is relatively low, thereby producing lower than optimum electrolysis rates.

It has been found that the addition of 5-20 percent $LiBO_2$ to the KCl-LiCl system increases the solubility of iron oxide, produces a higher deposition rate of the iron, and greatly increases the rate of the anodic reaction to produce CO and/or $CO_2$, while maintaining many of the desirable properties of the KCl-LiCl system.

The process of this invention is typically conducted in an inert or reducing atmosphere, such as nitrogen and carbon monoxide, to prevent re oxidation of the metallic iron product. However, depending on the molten salt the process can be under ambient atmospheric conditions.

The appropriate temperature for the electrolysis step of the process depends on the molten salt(s) used. The temperature should be high enough for adequate solubility of the iron from the titaniferous feed material. Usually the temperature ranges from 100 to 1300 degrees Celsius. For the KCl-LiCl+5-20 weight percent $LiBO_2$ system, an appropriate range is 600-1000 degrees Celsius, preferably between 700 and 900 degrees Celsius.

The potential needed to deposit iron at the cathode is dependent on the molten salt system and reference electrode used. In the systems of the examples, a potential of $-0.2$ volts versus a silver quasi-reference electrode was usually found to be effective.

In a preferred embodiment of this invention the anode is carbon, such as, graphite or activated carbon, which is consumed during the process to produce CO and/or $CO_2$. When the anode is almost consumed a new anode is substituted.

The cathode is any conventional material, for example platinum or iron, on which iron from the titaniferous feed material can be deposited during electrolysis. An iron anode is preferred because the deposited iron does not need to be removed therefrom. When the buildup of iron on the cathode achieves a predetermined level, a new cathode can be substituted.

The particle size and morphology of the iron powder deposited at the cathode varies with the molten salt system used and the deposition voltage (and therefore rate). For example, in the KCl-LiCL+5-20 percent $LiBO_2$ system, the iron particles are 5-300 microns in size and slab-like in shape. The deposited iron is washed after removal from the process system to remove any retained molten salts.

The $TiO_2$ is significantly less soluble in the chosen molten salt system than the iron oxide. Therefore the $TiO_2$ will quickly reach its solubility and all additionally added $TiO_2$ will be a precipitate in the molten salt system. The $TiO_2$ is separated from the molten salt system using known techniques. After the precipitate is washed, it contains greater than 90% $TiO_2$.

In a preferred embodiment of the invention the feed titaniferous material is added continuously to a recirculating molten salt stream which is fed to an electrolysis reactor. The iron oxide is selectively dissolved in the molten salt. The iron ions migrate to and are deposited as iron metal powder at the cathode, preferably an iron cathode. The oxyanions migrate to and are deposited at the anode, preferably a consumable carbonaceous material e.g., graphite or activated carbon, with which the oxyanions react to generate CO and/or $CO_2$. The cathode is replaced periodically to recover the iron product. The consumable anode is also replaced periodically. The undissolved beneficiated $TiO_2$ fraction is separated from the molten salt by filtration or other suitable solid-liquid separation device. The molten salt is returned to the reactor. Both the titaniferous solids, which cancontain in excess of 90 percent $TiO_2$, and the deposited iron, are washed free of residual salt.

EXAMPLES

The following examples illustrate this invention:

EXAMPLE 1

55.6 g KCl and 44.4 LiCl is added to an alumina crucible inside a quartz tube. The mix is heated in a crucible furnace under a flow of 250 cc/min of 10 percent CO in helium over 90 minutes to 500 degrees Celsius, and then over 1 hour to 800 degrees Celsius. After characterization of the melt in the absence of ilmenite, the melt is cooled overnight to 25 degrees Celsius under the helium/CO mix, and then reheated to 800 degrees Celsius as before. 10 g of partially reduced ilmenite sand (ferric iron reduced to ferrous) is then added to the melt, and the molten mix is sparged with the gas mix for 40 minutes, and allowed to settle for 15 minutes. Then the electrodes are immersed in the solution to a depth of approximately 4 cm.

The cathode is an 8 cm long, 0.5 mm diameter platinum wire folded in a tight loop around a platinum lead wire and twisted together so that the total length of wire is 4 cm, and the approximate area is 1.3 $cm^2$. The anode is a 4 cm long, 6mm o.d. solid graphite rod. A spiral groove is cut at the top of the rod, and a platinum lead wire is wound tightly into the groove to hold the electrode and provide electrical connection to a potentiostat. A 2 mm diameter silver wire is used as a quasi-reference electrode.

As the potential of the platinum electrode versus the Ag quasi-reference is swept from +0.3 V, which gives zero current flow, to more negative voltages, deposition of metallic iron begins to occur, peaking near −0.2 to −0.4 V, depending on the sweep rate. When the platinum electrode is held at a voltage of −0.25 V a steady current density of approximately 0.01 A/$cm^2$ can be maintained in the stagnant melt. Substantially higher current densities would be expected in an agitated system. The electrodeposited iron is platy and ranges in size from 10 to 100 microns. EDAX analysis of the iron product yields the following analysis: 81.6% Fe, 0.98% Ti, 8.6% K, and 8.8% Cl. The K and Cl results from incomplete washing of the Fe product and could be easily removed by further washing with water. Thus, on a salt free basis, the iron purity is roughly 98.8%.

When the potential of the graphite electrode vs. The Ag quasi-reference is swept from +0.33 V, which gives zero current flow, to more positive voltages, very little oxidation is observed until voltages exceeding 0.8 V are reached when Cl- ions in the salt begins to be oxidized to $Cl_2(g)$ Thus, the oxidation of oxyanions to CO and/or $CO_2$ is very slow in this system.

EXAMPLE 2

200 g $KBO_2.xH_2O$ (x=0.85) and 131 g $LiBO_2$ are added to an alumina crucible inside a quartz tube, and heated in a crucible furnace under a flow of 250 cc/min of helium over a 3 hour period to 850 degrees Celsius. After characterization of the melt in the absence of ilmenite, the melt is cooled overnight to 25 degrees Celsius in helium. 10 g of partially reduced ilmenite sand (ferric iron reduced to ferrous) are added to the frozen melt, and the mix is heated in helium to 850 degrees Celsius over a 3 hour period. The melt is then sparged with helium for 1 hour, and allowed to settle for 15 minutes. Then the electrodes are immersed to a depth of 4 cm. The same types of electrodes are used as in Example 1, except that in some experiments the platinum electrode are used as the anode, and the graphite used as the cathode.

As the potential of the platinum electrode versus the Ag quasi-reference is swept from 0 V, which gives zero current flow, to more negative voltages, iron deposition begins to occur, and peaks between −0.4 and −0.6 V depending on the sweep rate. At potentials more negative than about −0.6 V reduction of the melt begins to occur. For potentials of −0.2 V, −0.4 V and −0.6 V, steady current densities of 0.015, 0.035, and 0.065 A/$cm^2$, respectively, are obtained in a stagnant melt. Agitation of the melt would be expected to yield significantly higher current densities. When iron is deposited for 30 minutes at −0.2 V, the iron particles ranged in size from 10 to 100 um, and are covered with frozen melt which is very difficult to wash off.

When platinum is used as the anode, no significant oxidation reactions are observed until above roughly +0.7 V. However, when the graphite electrode are used as the anode an oxidation reaction is clearly evident for potentials more positive than −0.3 V. This reaction presumably corresponds to reaction of an oxyanion in the melt with the graphite electrode to produce Co and/or $CO_2$. This is verified by the fact that after prolonged oxidation, the graphite electrode is badly pitted.

A substantial problem associated with the $KBO_2$-$LiBO_2$ system is that it is very difficult to wash the flux off the iron deposit. Moreover, $TiO_2$ has a strong tendency to form titanates with the melt. X-ray diffraction analysis of the solid residue indicates that the major phase present is $Li_2TiO_3$.

EXAMPLE 3

55.6 g KCl, 44.4 LiCL and 5.0 g of partially reduced ilmenite sand (ferric iron reduced to ferrous) are added to an alumina crucible inside a quartz tube. The mix is heated in a crucible furnace under a flow of 250 cc/min of 10 percent CO in helium over 90 minutes to 500 degrees Celsius, and then over 1 hour to 800 degrees Celsius. The melt is then sparged with the gas mix for 20 minutes and allowed to settle for 5 minutes before inserting the electrodes into the melt to a depth of approximately 4 cm. The same types of electrodes are used as in Examples 1 and 2.

When the potential of the platinum electrode versus the Ag quasi-reference is swept from +0.1 V, which gives zero current flow, to more negative potentials, iron deposition begins to occur, and peaks near −0.2 to −0.4 V, depending on the sweep rate. At a potential of −0.2 V, a steady current density of roughly −0.035 A/$cm^2$ is obtained. Agitation of the melt is expected to result in substantially higher current densities. The platy iron particles obtained range in size from 100 to 200 um. An X-ray diffraction pattern of the deposit indicates that it consists of roughly a 2:1 mixture of Fe and Ag; the Ag coming from some dissolution and deposition of the Ag quasi reference electrode. The silver impurity can be prevented by using a proper reference electrode.

When the potential of the graphite electrode versus the Ag quasi-reference is swept from +0.1 V, which gives zero current flow to more positive potentials, an oxidation peak is observed near +0.2 to +0.4 V, depending on the sweep rate. This peak is attributed to the reaction of oxyanions in the melt with the graphite electrode to produce CO and/or $CO_2$.

EXAMPLE 4

55.6 g KCl, 44.4 g LiCl, 5.0 g $LiBO_2$, and 10.0 g of partially reduced ilmenite sand (ferric iron reduced to ferrous) are added to an alumina crucible inside a quartz tube. The mix is heated in a crucible furnace under a flow of 250 cc/min of 10 percent CO in helium over 90 minutes to 500 degrees Celsius, and then over 1 hour to 800 degrees Celsius. The molten mix is then sparged for 30 minutes and allowed to settle for 10 minutes. Then the electrodes are immersed in the solution to a depth of approximately 4 cm.

The cathode consists of an 8 cm long, 1.0 mm diameter iron wire folded in a tight loop around a platinum lead wire, and twisted together so that the total length of the wire is 4 cm, and the approximate area is 2.6 $cm^2$. A graphite electrode like the ones used in Examples 1-3 are used as the anode, and a 2 mm diameter silver wire serves as a quasi-reference electrode.

As the potential of the iron electrode versus the Ag quasi-reference electrode is swept from −0.1 V, which gives zero current flow, to more negative voltages, iron deposition begins to occur, and peaks near −0.2 to −0.4 V depending on the sweep rate. When the iron electrode is held at a potential of −0.2 V, a steady current density of 0.015 A/$cm^2$ can be maintained in the stagnant melt. An average current density of roughly 0.25 A/$cm^2$ is achieved when the potential of the iron electrode is maintained at −1.0 V for 3200 s. Following the 3200 s iron deposition experiment, the graphite anode is noticeably smaller in size and pitted, indicating significant reaction; most likely the reaction of oxyanions in the melt to form CO and/or $CO_2$.

The electrodeposit on the iron cathode is a mixture of fine needle-like particles 10-100 um in size, and more irregularly shaped particle greater than 50 um in size. X-ray diffraction analysis of the deposit shows both metallic iron and silver in an approximate 2:1 ration, similar to Example 3. The silver contamination can be avoided by using a proper reference electrode.

X-ray diffraction analysis of the residual solid in the melt indicates the presence of magnetite $Fe_3O_4$, $TiO_2$, and $LiO.8Ti_{2.2}O_{4.8}$, plus traces of $Fe_2O_3$ and possibly $Li_2MgTi_3O_8$. The iron oxides present are due to the fact the iron dissolution/electrodeposition is only run for a fraction of the time necessary for complete removal of iron from the system.

EXAMPLE 5

55.6 g KCl, 44.4 g LiCl, 24.0 g $LiBO_2$, and 10.0 grams of partially reduced ilmenite sand (ferric iron reduced to ferrous) are added to an alumina crucible inside a quartz tube. The mix is heated in a crucible furnace under a flow of 250 cc.min of 10 percent CO in helium over 90 minutes to 500 degrees Celsius, and then over 1 hour to 800 degrees Celsius. The molten mix is then sparged with the gas mix for 20 minutes, and allowed to settle for 5 minutes. Then the electrodes are immersed in the solution to a depth of approximately 4 cm. The same types of electrodes are used as in Examples 1-3.

As the potential of the graphite electrode versus the Ag reference is increased from +0.025 V, which gives zero current flow, to more positive voltages, an oxidation reaction is observed with a peak near +0.1 to +0.4 V depending on the sweep rate. This reaction is attributed to the reaction of oxyanions in the melt with the graphite anode to form CO and/or $CO_2$.

When the potential of the platinum electrode versus the Ag reference is swept from +0.33 V, which gives zero current flow, to more negative voltages, deposition of metallic iron begans to occur at approximately +0.1 V, and peaks near −0.1 to −0.4 V, depending on the sweep rate. At potentials more negative than about −0.4 volts, reduction of the melt starts to become significant. For a potential of −0.2 V, a steady current density of roughly 0.05 A/$cm^2$ is maintained in a stagnant melt. Agitation of the melt is expected to yield substantially higher current densities. After 30 minutes, the cathode is removed, and is covered with needle-like iron particles up to 2 mm in length with an aspect ratio greater than 10.

EXAMPLE 6

After deposition of iron on the platinum electrode in Example 5, the platinum electrode is replaced with an iron electrode of the same type as described in Example 4. When the potential of the iron electrode vs. The Ag quasi-reference is swept from −0.15 V, which gives zero current flow, to more negative potentials, iron deposition begins to occur with a peak near −0.2 to −0.5 V, depending on the sweep rate. When the potential of the iron electrode is maintained at −0.25 V for 30 minutes, a steady current density of 0.01 A/$cm^2$ is obtained. In this case, the iron deposit is not needle-like, but more platy, with particles ranging in size from 50 to 300 microns.

What is claimed is:

1. A process for beneficiating titaniferous material containing iron oxide comprising:
   (a) mixing said material with a molten salt or mixture of molten salts in which iron oxide dissolves to produce iron ions and oxyanions,
   (b) electrolytically reducing the iron ions to iron at the cathode to deposit high purity iron on the cathode and reacting the oxyanions with a carbonaceous anode to generate CO and/or $CO_2$, and
   (c) recovering a beneficiated $TiO_2$ product from the molten salt or mixture of molten salts.

2. The process of claim 1 wherein the molten salt or mixture thereof have following characterics:
   a—high solubility for iron oxide below 1300 degrees Celius,
   b—relatively lower solubility for $TiO_2$,
   c—high decomposition voltage,
   d—low viscosity,
   e—easily removed from the particulate and iron, and
   f—minimally consumed during the process.

3. The process of claim 1 wherein the molten salt is an alkali or alkaline earth halide, hydroxide, carbonate, borate, sulfate or mixture thereof.

4. The process of claim 1 wherein said molten salt is a mixture of alkali chlorides and, optionally, alkali metaborate.

5. The process of claim 4 wherein said molten salt is a mixture of LiCl-KCl, optionally having added 1-20 weight percent $LiBO_2$, based on the weight of the LiCl-KCl mixture.

6. The process of claim 5 wherein the LiCl-KCL mixture contains 35-55 % LiCl.

7. The process of claim 5 wherein said LiCl-KCl mixture comprises about 45 percent LiCl and about 55 percent KCl.

8. The process of claim 4 wherein the electrolysis is performed at a temperature of about 600-1000 degrees Celsius.

9. The process of claim 5 wherein the electrolysis is at a temperature of about 700 to 900 degrees Celsius.

10. The process of claim 1 wherein the proportion of titaniferous material mixed with molten salt is about 1-50 weight percent based on the total weight.

11. The process of claim 1 wherein the electrolysis is performed in a flow system.

12. The process of claim 1 wherein step (b) is potentiostatically controlled.

13. The process of claim 1 wherein step (a) is preceded by chemical reduction of titaniferous material to convert ferric iron to ferrous iron.

14. The process of claim 1 where the $TiO_2$ component of the ore is dissolved in the molten salt, and later re-precipitated.

15. A process of beneficiating titaniferous material containing iron oxide, the process comprising:
  a—adding and mixing continuously titaniferous material to a recirculating stream of molten salt or mixtures thereof in a reactor,
  b—dissolving selectively the iron oxide in the molten salt to produce iron ion and oxyanion,
  c—electrolytically reducing the iron ion and metallic iron at a cathode which is removed periodically to recover iron product,
  d—reacting oxyanion with a consumable carbonaceous anode to generate CO and/or $CO_2$ and replacing the anode periodically
  e—separating undissolved beneficiated $TiO_2$ from the molten salt by a suitable solid-liquid separation device,
  f—returning the molten salt to the reactor, and
  g—washing the iron and $TiO_2$ substantially free of residual molten salt.

16. The beneficiated $TiO_2$ produced by the process of claim 1.

17. The beneficiated $TiO_2$ produced by the process of claim 15.

18. The iron produced by the process of claim 1.

19. The iron produced by the process of claim 15.

* * * * *